(12) United States Patent
Mao et al.

(10) Patent No.: US 12,536,857 B2
(45) Date of Patent: Jan. 27, 2026

(54) METHOD OF AUTOMATICALLY OPENING AND CLOSING DOOR BODY OF REFRIGERATION OR HEATING BOX BY RECOGNIZING USER IDENTITY

(71) Applicant: Jiangxi Wesonorous Technology Co., Ltd, Fuzhou (CN)

(72) Inventors: Weike Mao, Zhuhai (CN); Mingze Yang, Zhuhai (CN); Fuyuan Ning, Zhuhai (CN); Zhiwei Yang, Zhuhai (CN); Wei Chen, Zhuhai (CN); Jiawei Liu, Zhuhai (CN); Chuanggen Zhu, Zhuhai (CN)

(73) Assignee: Jiangxi Wesonorous Technology Co., Ltd, Fuzhou (CN)

( * ) Notice: Subject to any disclaimer, the term of this patent is extended or adjusted under 35 U.S.C. 154(b) by 22 days.

(21) Appl. No.: 18/733,374

(22) Filed: Jun. 4, 2024

(65) Prior Publication Data

US 2025/0316121 A1 Oct. 9, 2025

(30) Foreign Application Priority Data

Apr. 3, 2024 (CN) .......................... 202410402318.6

(51) Int. Cl.
*G07C 9/37* (2020.01)
*E05F 15/73* (2015.01)

(52) U.S. Cl.
CPC .............. *G07C 9/37* (2020.01); *E05F 15/73* (2015.01)

(58) Field of Classification Search
CPC .......... G07C 9/37; E05F 15/73; H04W 4/029; H04W 4/021; G06Q 30/0201; G06Q 10/087; G06Q 30/02; G06F 9/541; G06K 9/00771
See application file for complete search history.

(56) References Cited

U.S. PATENT DOCUMENTS

| | | | |
|---|---|---|---|
| 10,240,847 B1* | 3/2019 | Thomas, Jr. ......... | F25D 11/003 |
| 2012/0051030 A1* | 3/2012 | Johnson ............... | F25D 17/042 |
| | | | 362/92 |
| 2014/0313006 A1* | 10/2014 | Mason .................. | H05B 47/10 |
| | | | 340/6.1 |
| 2019/0189132 A1* | 6/2019 | Viswanathan ......... | G10L 15/22 |
| 2020/0412539 A1* | 12/2020 | Uy ............................ | H04L 9/14 |
| 2023/0267786 A1* | 8/2023 | Kashi ................ | G07C 9/00912 |
| | | | 70/63 |

FOREIGN PATENT DOCUMENTS

CN 105716359 B * 5/2018 ........... F25D 23/028

* cited by examiner

*Primary Examiner* — Vernal U Brown

(57) ABSTRACT

A method of automatically opening and closing a door body of a refrigeration or heating box by recognizing a user identity, including: S1, obtaining, by a logic control unit of the refrigeration or heating box, user identity information based on information from an external sensor; S2, recognizing and determining, by the logic control unit, the user identity information to obtain a recognition result; in response to the recognition result being that the user identity information is not authorized, displaying, by a display screen of the refrigeration or heating box, an error prompt; and S3, in response to the recognition result being that the user identity information is authorized, opening, by a control circuit system of the refrigeration or heating box, the door body.

7 Claims, 1 Drawing Sheet

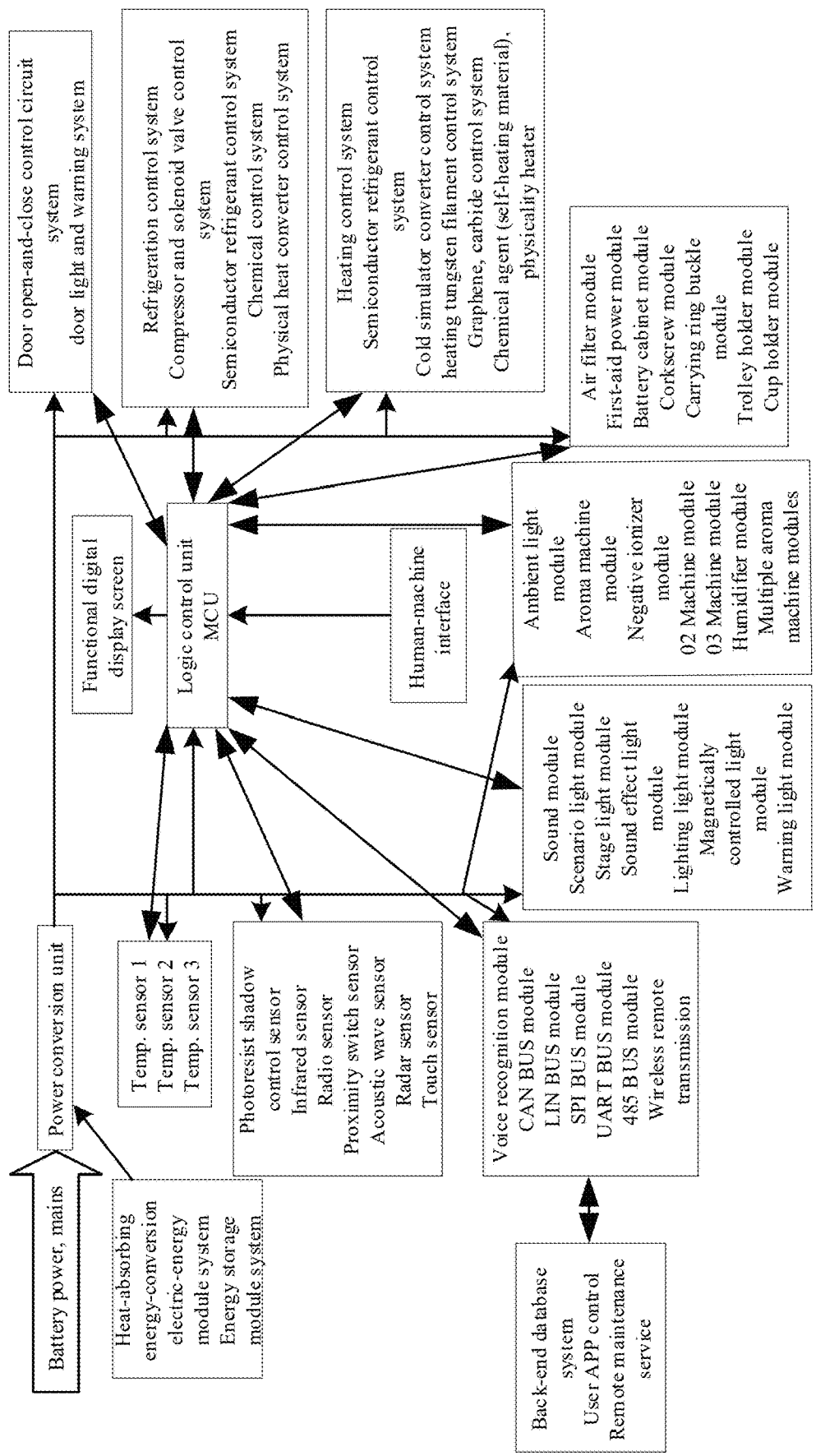

METHOD OF AUTOMATICALLY OPENING AND CLOSING DOOR BODY OF REFRIGERATION OR HEATING BOX BY RECOGNIZING USER IDENTITY

CROSS REFERENCE

The present disclosure claims priority of Chinese Patent Application No. 202410402318.6 filed on Apr. 3, 2024, the entire contents of which are hereby incorporated by reference in their entirety.

TECHNICAL FIELD

The present disclosure relates to the technical field of mobile portable refrigerators or heating boxes, and more specifically to a method of automatically opening and closing a door body of a refrigeration or heating box by recognizing user identity.

BACKGROUND

Currently, the takeaway industry is prevalent. There are many people working in this industry, and competition from multiple platforms has intensified. Along therewith, the platforms and customers have increased the demand for delivery of takeaways, and therefore, the takeaway deliverers have accelerated their work pace to meet the requirements and to increase the delivery volume, often leaving with the takeaway boxes opened and returning to find that takeaways have been stolen. Even worse, the takeaways are poisoned without anyone realizing it, which is a very high risk. Since it is difficult to rely on the takeaway deliverers themselves to take precautions, the market is calling for a mobile refrigerator or heating box with an automatic opening and closing door, so as to provide assistance to the takeaway deliverers and to effectively solve the potential food safety issues. In addition, a convenient and safe mobile refrigerator may be provided for a user who loves to travel, for preventing food spoilage caused by the user forgetting to close the door of the refrigerator or heating box. In this way, the user can concentrate on entertainment, which ensures a better usage experience.

SUMMARY OF THE DISCLOSURE

To solve the above problems, the present disclosure provides method of automatically opening and closing a door body of a refrigeration or heating box by recognizing user identity.

In order to achieve the above objectives, the present technical solution is as follows:

A method of automatically opening and closing a door body of a refrigeration or heating box by recognizing a user identity, including:

S1, obtaining, by a logic control unit of the refrigeration or heating box, user identity information based on information from an external sensor;

S2, recognizing and determining, by the logic control unit, the user identity information to obtain a recognition result; in response to the recognition result being that the user identity information is not authorized, displaying, by a display screen of the refrigeration or heating box, an error prompt; and S3, in response to the recognition result being that the user identity information is authorized, opening, by a control circuit system of the refrigeration or heating box, the door body.

In some embodiments, the external sensor in the S1 includes one or more of a photoresist shadow control sensor, an infrared sensor, a radio sensor, a proximity switch sensor, an acoustic wave sensor, a radar sensor, and a touch sensor.

In some embodiments, the refrigeration or heating box further includes a voice recognition module connected to the logic control unit for collecting voice information.

In some embodiments, the refrigeration or heating box further includes a transmission module connected to the logic control unit, the transmission module being configured to be connected to a backend database system.

In some embodiments, the transmission module includes one or more of a CAN BUS module, a LIN BUS module, a SPI BUS module, a UART BUS module, and a 485 BUS module.

In some embodiments, the logic control unit is further connected to a sound module, a scenario light module, a stage light module, a sound effect light module, a lighting light module, a magnetically controlled light module, and a warning light module.

In some embodiments, the logic control unit is further connected to a fragrance machine module, a negative ionizer module, and a humidifier module.

In some embodiments, the refrigeration or heating box further includes a heat-absorbing energy-conversion electric-energy module system and an energy storage module system connected to the logic control unit.

In some embodiments, the refrigeration or heating box further includes a refrigeration control system connected to the logic control unit, the refrigeration control system having a control system connected to a compressor and a solenoid valve, a semiconductor refrigeration chip control system, a chemical agent control system, and a physical heat converter control system.

In some embodiments, the refrigeration or heating box further includes a heating control system connected to the logic control unit, the heating control system having a semiconductor refrigeration sheet control system, a cold simulator converter control system, a heating tungsten filament control system, a graphene and carbide control system, and a chemical agent and a physicality heater.

Technical Effect

In the present disclosure, multiple sensors may be applied to obtain the user identity information, so as to ensure that the information is accurate. When the identity verification is complete, the logic control unit controls the circuit system to open the door body, such that the user can access the internal food, without the need of opening or closing the door body by him-/herself, while the system will conduct the control on its own. In this way, the user is free from the worry of forgetting to close the door body.

BRIEF DESCRIPTION OF THE DRAWINGS

In order to illustrate the technical solutions in the embodiments of the present disclosure more clearly, the accompanying drawings to be used in the description of the embodiments will be briefly described below.

FIG. 1 is a block schematic diagram according to some embodiments of the present disclosure.

DETAILED DESCRIPTION

In order to make the technical problems solved by the present disclosure, and the technical solutions and beneficial effects brought by the present disclosure clearer and more understandable, the present disclosure is described in further detail hereinafter in conjunction with the accompanying drawings and embodiments. It should be understood that the specific embodiments described herein are only for explaining the present disclosure and are not intended to limit the present disclosure.

Referring to FIG. 1, a method of automatically opening and closing a door body of a refrigeration or heating box by recognizing a user identity, including the following operations.

S1, obtaining, by a logic control unit (Micro Controller Unit, MCU) of the refrigeration or heating box, user identity information based on information from an external sensor;

S2, recognizing and determining, by the logic control unit, the user identity information to obtain a recognition result; in response to the recognition result being that the user identity information is not authorized, displaying, by a display screen of the refrigeration or heating box, an error prompt;

S3, in response to the recognition result being that the user identity information is authorized, opening, by a control circuit system of the refrigeration or heating box, the door body.

In the present disclosure, multiple sensors may be applied to obtain the user identity information, so as to ensure that the information is accurate. When the identity verification is complete, the logic control unit controls the circuit system to open the door body, such that the user can access the internal food, without the need of opening or closing the door body by him-/herself, while the system will conduct the control on its own. In this way, the user is free from the worry of forgetting to close the door body.

In the embodiments, the sensor in step S1 may be one or more of a photoresist shadow control sensor, an infrared sensor, a radio sensor, a proximity switch sensor, an acoustic wave sensor, a radar sensor, and a touch sensor.

By virtue of one or more of an infrared sensor, a proximity switch sensor, an acoustic wave sensor module, a radio sensor module, a radar sensor module, a voice recognition sensor module, a photo-resistive shadow-control sensor (CdS), a [CAN BUS or LIN BUS or I2C BUS or SPI BUS or UART BUS or 485 BUS or a remote control module for wired and wireless transmissions], and a one-touch start control, the user information is sensed and compared with saved information, thereby realizing the user identity recognition. When the matching is successful, the door body of the refrigeration or heating box is opened or closed by controlling a door opening and closing device;

The user is comprehensively identified by the obtained information from the multiple sensors, preventing the occurrence of a situation in which the door body is always not opened due to erroneous information, thereby improving the accuracy of information acquisition.

In the embodiments, the refrigeration or heating box further includes a voice recognition module connected to the logic control unit for collecting voice information. In the present disclosure, voice information from the user may be obtained for controlling. The user can record a voice manipulation beforehand, for example, to open the door body or to close the door body or to lower the temperature, etc., such that the MCU, after determining the user information, can allow the user to control the refrigeration or the heating box to operate according to his/her voice.

In the embodiments, the refrigeration or heating box further includes a transmission module connected to the logic control unit, the transmission module being configured to be connected to a backend database system.

Specifically, the transmission module is one or more of a CAN BUS module, a LIN BUS module, a SPI BUS module, a UART BUS module, and a 485 BUS module.

In addition, the refrigeration or heating box is further capable of obtaining data including: product ID, number of opening and closing the door body, preset temperature, operation temperature, ambient temperature, fault status, operation voltage, and other equipment status data (e.g. fragrance machine: wind speed, concentration; ambient light: brightness, color transfer).

Transmission method of the collected data: transmission through CAN BUS or LIN BUS or I2C BUS or SPI BUS or UART BUS or 485 BUS or wired and wireless transmission, to APP or backend or big data . . . etc.; supplying to other system applications or corresponding information system purchasing and selling vendors.

In the embodiments, the logic control unit may be further connected to a sound module, a scenario light module, a stage light module, a sound effect light module, a lighting light module, a magnetically controlled light module, and a warning light module.

While opening and closing the door, one or more of LED and display screen is available on the box to display the status of a front end, a middle end, and a back end of the opening and closing of the door.

The way of display; LED light warning method. The LEDs may emit warm yellow light or white light or RGB full color white light. The duration of the door being opened can be set as 60 seconds, 120 seconds, or 180 seconds. Three kinds of extended closing time: when the door keeps opened for a first period of time, the LEDs are slow flashing or different colors to remind; when the door keeps opened for a second period of time, the LEDs are different fast flashing or different colors to remind; when the door keeps opened for a third period of time, the LEDs are different-speed flashing or different colors to warn, and the door is closed with an alarm or reminder issued.

In the embodiments, the logic control unit may be further connected to a fragrance machine module, a negative ionizer module, and a humidifier module.

In the embodiments, the refrigeration or heating box further includes a heat-absorbing energy-conversion electric-energy module system and an energy storage module system connected to the logic control unit.

In the embodiments, the refrigeration or heating box further includes a refrigeration control system connected to the logic control unit, the refrigeration control system having a control system connected to a compressor and a solenoid valve, a semiconductor refrigeration chip control system, a chemical agent control system, and a physical heat converter control system.

In the embodiments, the refrigeration or heating box further includes a heating control system connected to the logic control unit, the heating control system having a semiconductor refrigeration sheet control system, a cold simulator converter control system, a heating tungsten filament control system, a graphene and carbide control system, and a chemical agent and a physicality heater.

The above is only some embodiments of the present disclosure and is not intended to limit the scope of the implementation of the present disclosure. Others whose principles and basic structures are the same or similar to those of the present disclosure are within the scope of the present disclosure.

What is claimed is:

1. A method of automatically opening and closing a door body of a refrigeration or heating box by recognizing a user identity, comprising:

S1, obtaining, by a logic control unit of the refrigeration or heating box, user identity information based on information from an external sensor;

S2, recognizing and determining, by the logic control unit, the user identity information to obtain a recognition result; in response to the recognition result being that the user identity information is not authorized, displaying, by a display screen of the refrigeration or heating box, an error prompt; and S3, in response to the recognition result being that the user identity information is authorized, opening, by a control circuit system of the refrigeration or heating box, the door body;

wherein the refrigeration or heating box further comprises a heat-absorbing energy-conversion electric-energy module system and an energy storage module system connected to the logic control unit;

wherein the refrigeration or heating box further comprises a refrigeration control system connected to the logic control unit, the refrigeration control system having a control system connected to a compressor and a solenoid valve, a semiconductor refrigeration chip control system, a chemical agent control system, and a physical heat converter control system;

wherein the refrigeration or heating box further comprises a heating control system connected to the logic control unit, the heating control system having a semiconductor refrigeration sheet control system, a cold simulator converter control system, a heating tungsten filament control system, a graphene and carbide control system, and a chemical agent and a physicality heater.

2. The method according to claim 1, wherein the external sensor in the S1 comprises one or more of a photoresist shadow control sensor, an infrared sensor, a radio sensor, a proximity switch sensor, an acoustic wave sensor, a radar sensor, and a touch sensor.

3. The method according to claim 2, wherein the refrigeration or heating box further comprises a voice recognition module connected to the logic control unit for collecting voice information.

4. The method according to claim 3, wherein the refrigeration or heating box further comprises a transmission module connected to the logic control unit, the transmission module being configured to be connected to a backend database system.

5. The method according to claim 4, wherein the transmission module comprises one or more of a CAN BUS module, a LIN BUS module, a SPI BUS module, a UART BUS module, and a 485 BUS module.

6. The method according to claim 4, wherein the logic control unit is further connected to a sound module, a scenario light module, a stage light module, a sound effect light module, a lighting light module, a magnetically controlled light module, and a warning light module.

7. The method according to claim 6, wherein the logic control unit is further connected to a fragrance machine module, a negative ionizer module, and a humidifier module.

* * * * *